(12) United States Patent
Iwata (10) Patent No.: US 8,391,669 B2
(45) Date of Patent: Mar. 5, 2013

(54) VIDEO PROCESSING APPARATUS AND VIDEO PROCESSING METHOD

(75) Inventor: Takuya Iwata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 283 days.

(21) Appl. No.: 12/791,684

(22) Filed: Jun. 1, 2010

(65) Prior Publication Data

US 2010/0310229 A1    Dec. 9, 2010

(30) Foreign Application Priority Data

Jun. 4, 2009 (JP) .................. 2009-135313

(51) Int. Cl.
*H04N 5/932* (2006.01)
*H04N 5/935* (2006.01)
(52) U.S. Cl. ...................... 386/201; 386/217
(58) Field of Classification Search .......... 386/201–203, 386/207–216
See application file for complete search history.

(56) References Cited

U.S. PATENT DOCUMENTS

| 6,130,987 A * | 10/2000 | Tanaka ........................ 386/254 |
| 6,925,340 B1 | 8/2005 | Suito et al. |
| 2008/0037953 A1 | 2/2008 | Kawamura et al. |
| 2009/0122191 A1 * | 5/2009 | Winter et al. ................. 348/501 |
| 2010/0142912 A1 * | 6/2010 | So ................................. 386/2 |

FOREIGN PATENT DOCUMENTS

| JP | 2000-099097 A | 4/2000 |
| JP | 2000-215024 A | 8/2000 |
| JP | 2002-314945 A | 10/2002 |
| JP | 2009-044611 A | 2/2009 |
| JP | 2009-075280 A | 4/2009 |
| WO | 03/019535 A1 | 3/2003 |
| WO | 20061082787 A1 | 8/2006 |

* cited by examiner

*Primary Examiner* — Thai Tran
*Assistant Examiner* — Nigar Chowdhury
(74) *Attorney, Agent, or Firm* — Canon U.S.A., Inc. IP Division (57) ABSTRACT

An apparatus, which controls a playback speed of a video content to enable the sound included therein to be in a well-audible range, is provided. A playback speed range is calculated based on sound characteristic information obtained by analyzing audio data of a video content and a predetermined sound parameter. A specific playback speed in the playback speed range is calculated based on a selected playback speed, and a video content is played back at the playback speed.

12 Claims, 6 Drawing Sheets

VIDEO PROCESSING APPARATUS AND VIDEO PROCESSING METHOD

BACKGROUND OF THE INVENTION

1. Field of the Invention

The present invention relates to a video processing apparatus and a video processing method for controlling a video image playback speed.

2. Description of the Related Art

Recently, video cameras capable of shooting an image at various frame rates from a low frame rate of about 30 fps (frame per second) to more than 1000 fps, have been used. With this video camera, it is possible to dynamically switch the shooting frame rate during shooting. On the other hand, the frame rate when images are played back on a video player is generally 60 fps or 120 fps.

By using a difference between a shooting frame rate on a video camera and a playback frame rate on a video player, image display with special image effects can be obtained. For example, when a shooting frame rate is higher than a playback frame rate, a displayed image becomes a slow play image with a smooth motion. On the other hand, when the shooting frame rate is lower than the playback frame rate, a displayed image becomes a fast play image with a fast motion.

On the other hand, when an image including audio data is played back in a slow speed, the playback speed of sound becomes slow, so that a compass of a playback sound becomes lower than a real range, and it sometimes becomes difficult to catch the sound or voice (speech). On the other hand, when the image is played back in a fast speed, the compass of the playback sound becomes higher than a real range and it sometimes becomes difficult to catch the sound or voice.

Japanese Patent Application Laid-Open No. 2002-314945 discusses a speech rate conversion system that detects sound sections and soundless sections of the image, and partially deletes audio data of the soundless sections based on a playback speed specified by a user to thereby generate audio data to be output.

However, conventionally, audio data has been corrected uniformly based on a playback speed set by the user. Therefore, a sound that is easy to catch may not be outputted. Moreover, it has been difficult to adequately correct audio data if multi-frame rate video contents with different shooting (recording) frame rates are included in a single video content.

SUMMARY OF THE INVENTION

According to an aspect of the present invention, an apparatus includes a generating unit configured to analyze frequency characteristics of audio data of a video content, and generate sound characteristic information, a determining unit configured to determine a playback speed range based on the sound characteristic information and a predetermined sound parameter, a control unit configured to determine a specific playback speed in the playback speed range according to a selected playback mode, a processing unit configured to perform a frame decimation and/or interpolation processing on video data of the video content based on the specific playback speed, and an output unit configured to output the video data to a display unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory). Examples of firmware may include microcode, writable control store, micro-programmed structure. When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any medium that may store or transfer information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical storage medium, a magnetic storage medium, a memory stick, a memory card, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

Various exemplary embodiments, features, and aspects of the invention will be described in detail below with reference to the drawings.

Figure 1:
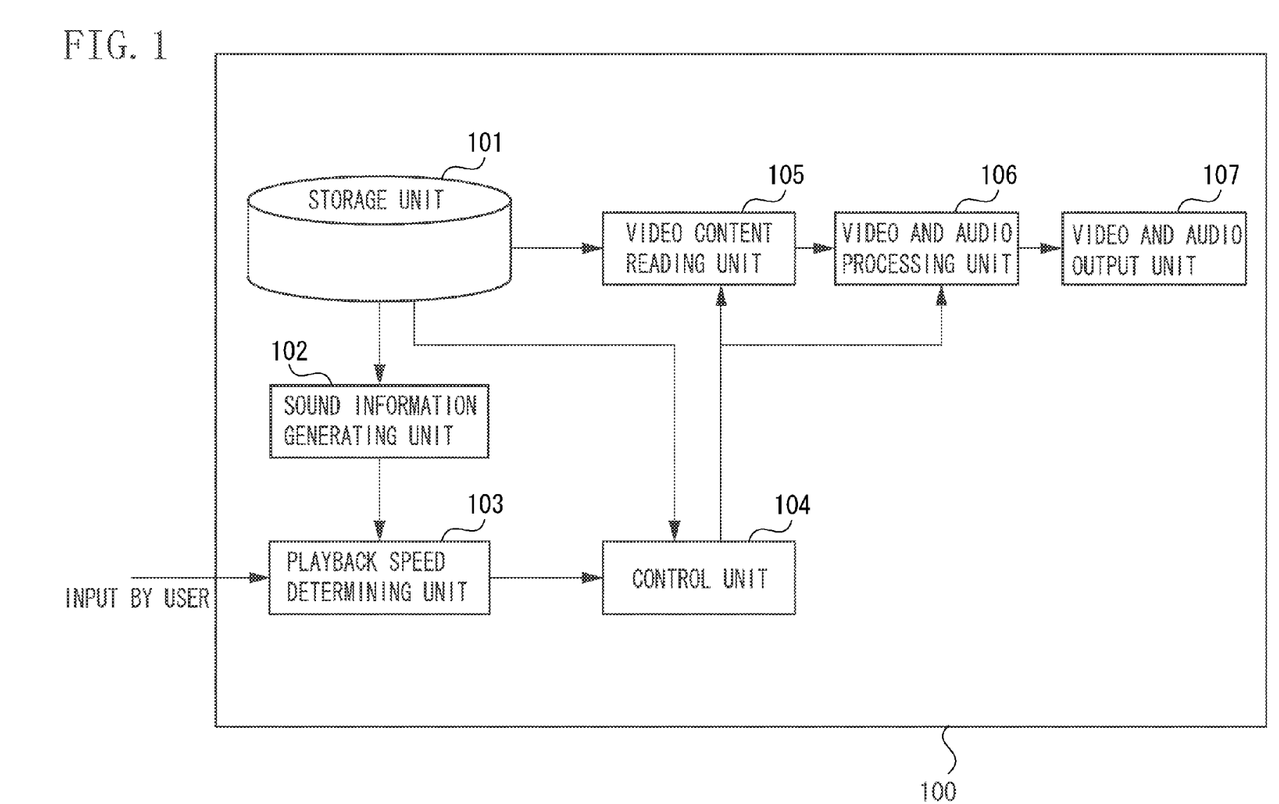
FIG. 1 is a block diagram illustrating a video playback apparatus according to an exemplary embodiment of the present invention.

FIG. 1 is a block diagram illustrating an example of a video playback apparatus 100 according to an exemplary embodiment of the present invention.

A storage unit 101 is a hard disk drive (HDD) or a flash memory to store video contents. Video contents are multiframe rate video contents composed of a plurality of video scenes with different shooting frame rates, and the video contents include audio data and video data coded according to Moving Picture Experts Group (MPEG) format.

As metadata of video content, the storage unit 101 stores preview image data, shooting (recording) frame rate information, and proper playback speed information. The playback speed refers to a speed of motion of a captured object at a time of shooting relative to a speed of motion of a captured object when it is played back.

A sound information generating unit 102 analyzes audio data recorded in the storage unit 101, and generates and outputs sound characteristic information to a playback speed determining unit 103. The sound characteristics are frequency characteristics of sound, and can be obtained by using discrete Fourier transform or fast Fourier transform. The sound characteristics are calculated for each plurality of frames corresponding to one scene of image data. The sound characteristic information is a set of sound characteristics calculated for each predetermined number of frames of video data.

The playback speed determining unit 103 calculates a range of a proper playback speed by using sound characteristic information. The proper playback speed range is a range of the proper video image playback speed, in which the user can catch the sound. The playback speed determining unit 103 determines a playback speed based on information about the proper playback speed range and information about a playback mode selected by the user.

The playback modes include a normal playback mode, an original playback mode, a slow playback mode, and a fast playback mode. In the slow playback mode or the fast playback mode, a sound priority slow playback mode or a sound priority fast playback mode can be set if the user specifies a sound priority in each case.

The playback speed information determined by the mode playback speed determining unit 103 is sent to a control unit 104. The video content reading unit 105 reads from the storage unit 101 a video content specified by the user according to an instruction from the control unit 104. A video and audio processing unit 106, according to a control signal from the control unit 104, decodes video data read out of the storage unit 101, and performs decimation and/or interpolation of decoded video data according to the playback speed The video and audio processing unit 106 further executes a compression/expansion processing on audio data read from the storage unit 101. A video and audio output unit 107 converts video data and audio data output from the video and audio processing unit 106, and outputs the converted video data and audio data to a display unit and a speaker, respectively.

The playback speed determining unit 103 calculates a proper playback speed as follows. The storage unit 101 has previously stored therein sound parameters by which to determine whether the sound synchronized with a video image is audible (whether the sound is within an audible frequency range).

More specifically, a set of sound parameters, which is determined on the assumption that a minimum value of frequencies of sound audible to ordinary users (human beings) is 20 Hz and a maximum value thereof is 20 kHz, is recorded. The minimum value may be set at 100 Hz based on a fact that sound of about 100 Hz or less is normally handled as noise.

A minimum frequency Fmin and a maximum frequency Fmax are extracted from sound characteristic information of input audio data, in other words, from data for each frequency band calculated for each predetermined number of frames. In this extraction, a limiting processing is performed on the data to neglect frequency bands in which the data value is lower than a predetermined threshold value. Then, latitudes Lmax and Lmin, which represent how much margin the input audio data has for the audible maximum frequency fmax and the audible minimum frequency fmin, are calculated using the following equations.

$$Lmax = fmax/Fmax$$

$$Lmin = Fmin/fmin$$

Based on the latitudes to the maximum frequency and the minimum frequency, a proper playback speed is calculated as follows. Let us suppose that a playback frame rate is fixed at 60 fps, and latitudes of audio data are Lmax=2 for the maximum frequency and Lmin=3 for the minimum frequency. In this case, playback at 1× speed (playback time is almost equivalent to shooting time) is within a range of the proper playback speed.

However, since the latitude for the maximum frequency Lmax is 2, the sound is audible even in 2× speed playback (in ½ shooting time). On the other hand, since the latitude is 3 for the minimum frequency, the sound is audible even in ⅓× speed playback (in 3 times longer than the shooting time). Therefore, a proper playback speed range is determined to be ⅓× to 2× speed.

Figure 3:
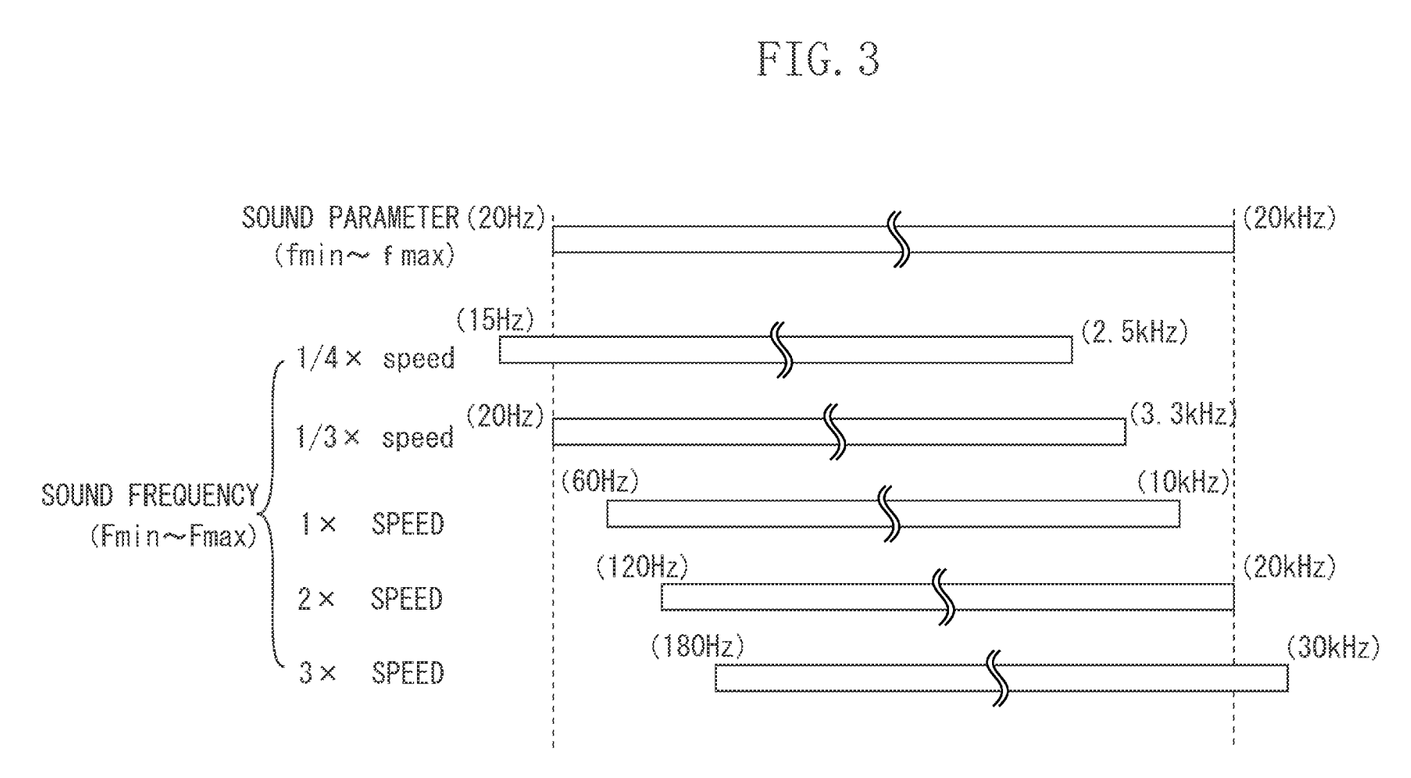
FIG. 3 is illustrates a proper playback speed range according to an exemplary embodiment of the present invention.

FIG. 3 illustrates a relation between the playback speed and the sound frequency described above.

The proper playback speed range is determined for each scene of a video content, and the speed range is stored in the storage unit 101 in association with content ID allocated to each video content and scene ID allocated to each scene. The calculation of the proper playback speed ranges is automatically executed by an instruction from the control unit 104 when the video content is stored in the storage unit 101.

Figure 2:
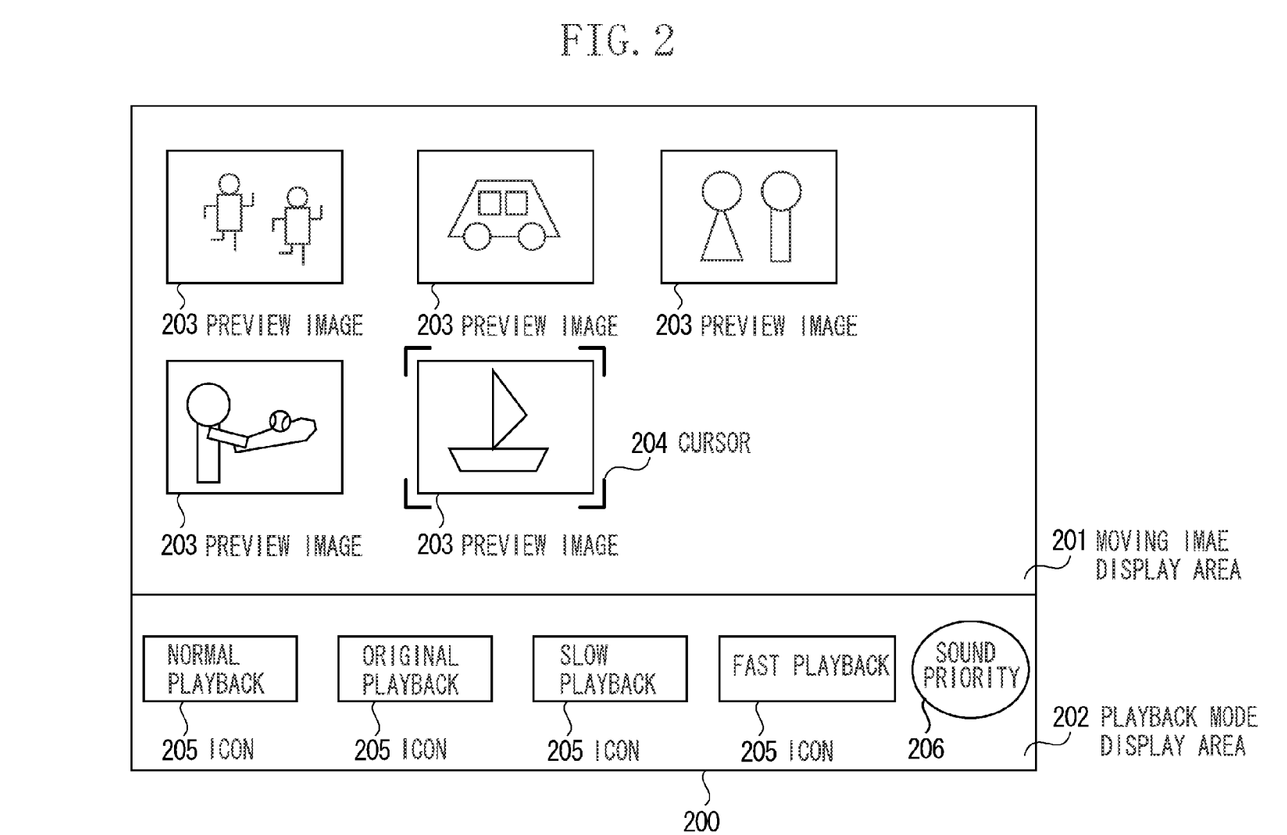
FIG. 2 illustrates a user selection screen according to an exemplary embodiment of the present invention.

FIG. 2 illustrates an example of a select screen 200 of a video content to be played back. An image display area 201 displays a list of playable contents to the user in the form of preview images 203 read from the storage unit 101. Instead of preview images 203, extracted still images or titles of the video contents may be displayed.

A playback mode display area 202 displays playback mode options of contents to the user. An icon 205 displays four replay modes, which will be described below. After a slow playback or a fast playback has been selected, if a sound priority icon 206 is selected, a sound priority slow playback or a sound priority fast playback is performed.

The user can select a playback content or a playback mode by operating a remote controller and placing a cursor 204 on a preview image icon and a playback mode icon.

A "Normal Playback" is a mode to play content at a fixed playback speed without depending on a shooting frame rate. Both a moving image taken (recorded) at 30 fps and a moving image taken (recorded) at 1200 fps are played back at 1× speed (the same time length as a shooting time). In this normal playback mode, since a video image is played back at the same speed as when the image was taken, a sound can be played back in a natural tone.

An "Original Playback" is a mode in which high frame rate video images are played in slow playback and low frame rate video images are played in fast playback according to a shooting frame rate. Since the playback frame rate is fixed (60 fps), images of 30 fps are played back at 2× speed (½ times the shooting time), and images of 1200 fps are played back at 1/20 speed (20 times the shooting time). In this Original Playback mode, since images are played back according to the shooting frame rate, image effects can be brought out to the maximum extent.

On the other hand, however, sometimes the sound is not audible to the user because the playback speed is too fast or too slow. A "Slow Playback" and a "Fast Playback" are modes, in which images are played back at a fixed playback speed, ⅓× speed or 3× speed, for example. A "Sound Priority Slow Playback" is a mode in which a proper minimum playback speed is selected as a specific playback speed from the proper playback speed range, and images are played back at a proper minimum playback speed.

For example, suppose that a sound is audible if scene A of a content is played back in a range from ½× speed to 2× speed, and scene B thereof is played back in a range from ⅓× speed to 3× speed. In this case, the playback speed is dynamically switched to ½× speed when scene A is played back and to ⅓× speed when scene B is played back.

In this mode, it is possible to meet the user's demand to watch a detailed motion of the image as slow as possible by slow playback in a range where the sound is audible to the user. The playback speed may be fixed throughout a whole content instead of switching over the playback speed from scene to scene of the content, for example.

The "Sound Priority Fast Playback" is a mode for playback at a proper maximum playback speed. For example, let us suppose that the sound is audible if scene C of a content is played back in a range from ½× speed to 2× speed and another scene D is played back in a range from ⅓× speed to 3× speed. In this case, playback of scene C is automatically switched to 2× speed and playback of scene D is switched to 3× speed.

In this mode, it is possible to satisfy the user's demand to watch video images of speedy motions within a range where the user can hear the sound. It is also possible to meet a condition to shorten viewing time within a range where the sound is audible.

Here, a relation between decimation and interpolation processing executed by the video and audio processing unit 106 is described below.

If a shooting frame rate is C (fps) and a playback frame rate is P (fps) (P and C are positive numbers), and if decimation and interpolation are not performed on input video data, a playback speed is P/C× speed. When the video data is decimated to 1/N of its original data (N is a positive number), the playback speed becomes PN/C× speed.

On the other hand, when the video data is interpolated to N times the original data, the playback speed becomes P/CN× speed. If the playback speed is made ⅖× speed, 5× interpolation processing and ½× decimation are executed.

Figure 4:
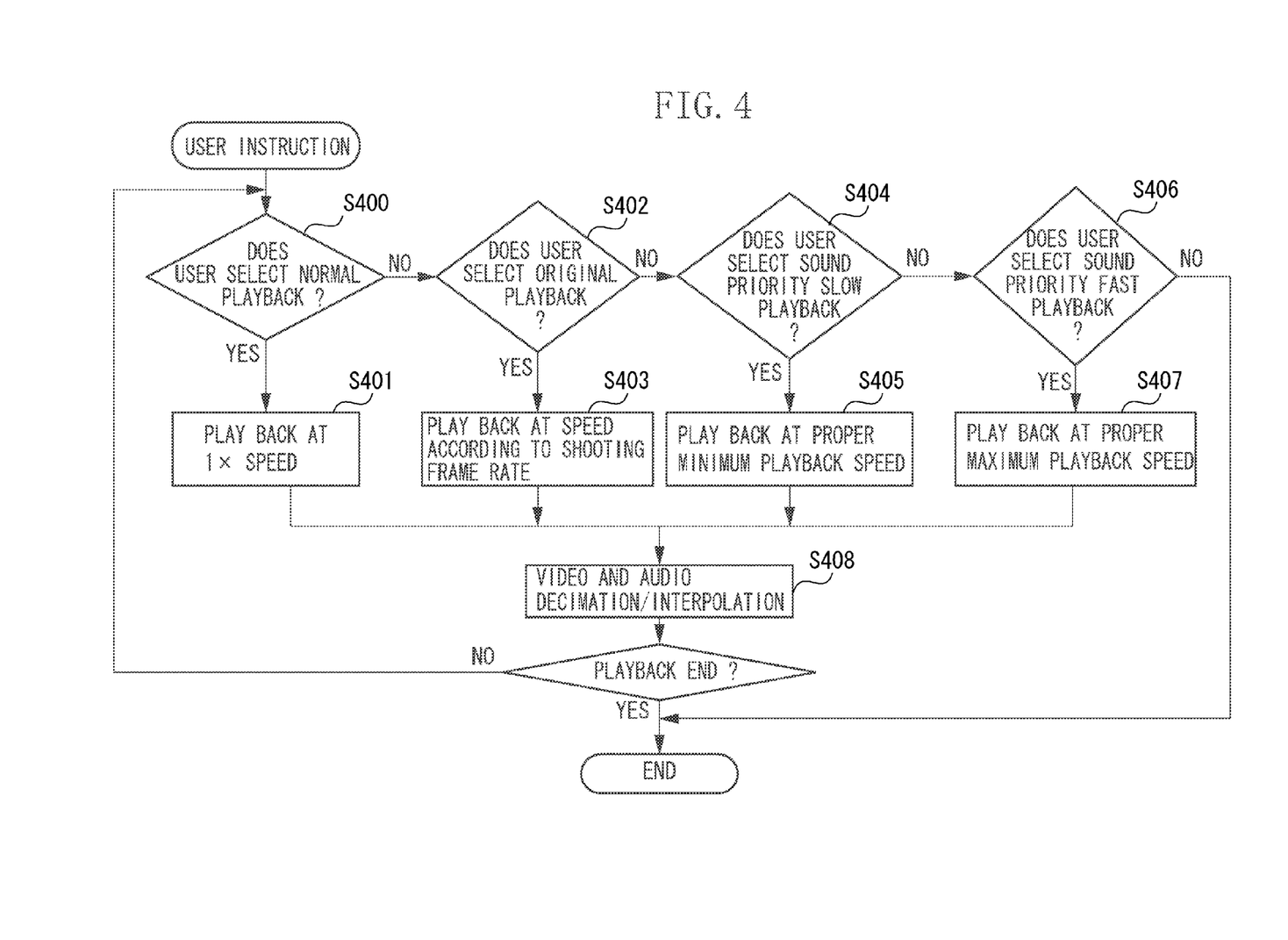
FIG. 4 is a flowchart illustrating a playback processing according to an exemplary embodiment of the present invention.

FIG. 4 is a flowchart illustrating processing of the control unit 104.

In step S401, if "Normal Playback" is selected (YES in step S400), the processing proceeds to step S401. In step S401, a selected video content is played back at a speed equivalent to the shooting speed (by 1× speed playback). To equalize the playback time and the shooting time, the control unit 104, in step S408, causes the video and audio processing unit 106 to perform decimation and/or interpolation on the content based on shooting frame rate information of the selected video content and playback frame rate information.

In step S402, if "Original Playback" is selected (YES in step S402), in step S403, the selected video content is played back in the slow playback or fast playback to meet a playback speed (frame rate) according to the shooting frame rate. The control unit 104 controls the video and audio processing unit not to decimate and/or interpolates the content.

In step S404, if "Sound Priority Slow Playback" is selected (YES in step S404), the selected video content is played back at a proper minimum playback speed in step S405. To enable playback at a proper minimum playback speed, the control unit 104, in step S408, causes the video and audio processing unit 106 to execute a decimation and/or interpolation on the content based on the shooting frame rate information of the selected video content and the playback frame rate information.

In step S406, if "Sound Priority Fast Playback" is selected (YES in step S406), the selected video content is played back at a proper maximum playback speed in step S407. To enable playback at a proper maximum playback speed, the control unit 104, in step S408, causes the video and audio processing unit 106 to decimate and/or interpolate the content based on the shooting frame rate information of the selected video content and the playback frame rate information.

In the present exemplary embodiment, playback of a multi-frame rate video content has been discussed, but the present exemplary embodiment is applicable to playback of a single shooting frame rate video content.

The "Original Playback" in the first exemplary embodiment is a mode in which high-frame-rate scenes are played back by slow playback and low-frame-rate scenes are played back by fast playback according to the shooting frame rate when a multi-frame rate video content is played back.

In the present exemplary embodiment, a "Proper Playback" mode is added, in which high-frame-rate scenes and low-frame-rate scenes are played back at respective proper playback speeds. The "Proper Playback" mode is selected by placing the cursor on a "Proper Playback" (not illustrated) added to the playback mode display area 202 in FIG. 2.

A block diagram of a video playback apparatus in the present exemplary embodiment is similar to that in FIG. 1. The playback speed determining unit 103 determines a playback speed based on information about the proper playback speed range of a selected video content recorded in the storage unit 101, shooting frame rate information, and playback mode information selected by the user.

In the "Proper Playback" mode, out of a multi-frame-rate video content, scenes taken at high frame rates are played back at a proper maximum playback speed, and scenes taken at low frame rates are played back at a playback minimum speed. The playback frame rate of 60 fps is set as a standard frame rate for shooting frame rates of video contents, and frame rates higher than 60 fps are specified as a high frame rate, and frame rates lower than 60 fps as a low frame rate.

For scenes the shooting frame rate of which is equal to the standard frame rate, those scenes are played back at 1× speed. In the "Proper Playback" mode, the scenes shot at a high frame rate are played back at a speed as slow as possible, and the scenes shot at low frame rates are played back at a speed as fast as possible, to the extent of the sound audible.

Therefore, the image effects with dynamic changes that the photographer intended can be maintained within a range where the sound is audible.

Figure 5:
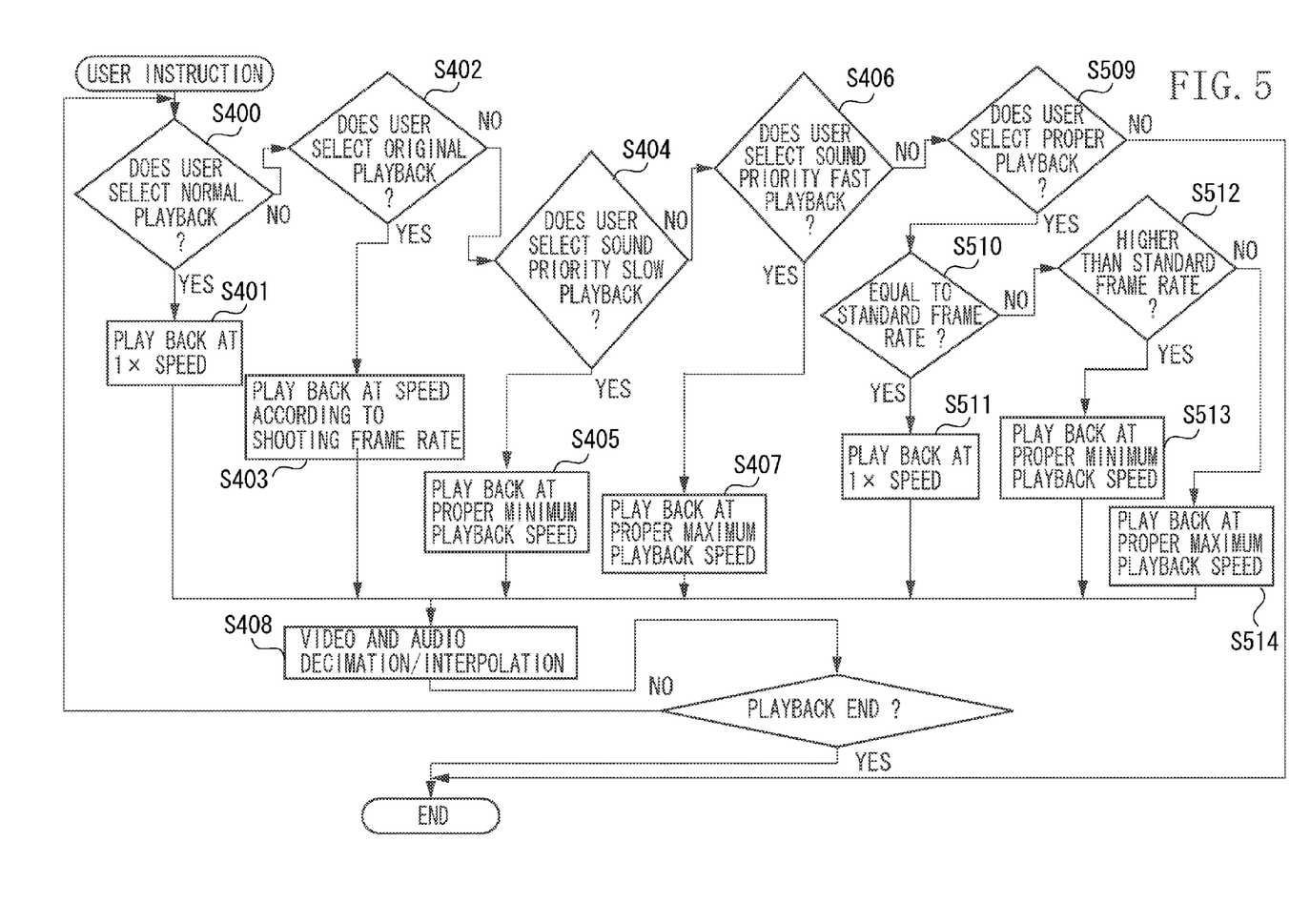
FIG. 5 is a flowchart illustrating another playback processing according to an exemplary embodiment of the present invention.

FIG. 5 is a flowchart illustrating the processing by the control unit 104 when the "Proper Playback" mode is selected. Steps 400 to 408 are similar to those in the first exemplary embodiment, their descriptions are not repeated here. With a selected video content, the shooting frame rate is dynamically switched over between 60 fps (scene A), 30 fps (scene B), and 1200 fps (scene C).

When the "Proper Playback" mode is selected (YES in step S509), the processing proceeds to step S510. In step S510, the shooting frame rate is compared with the standard frame rate, and if the shooting frame rate is equal to the standard frame rate (YES in step S510), then, in step S511, the content is played back at an equivalent speed (1× speed). If a high-frame-rate scene is played back (YES in step S512), a proper maximum playback speed is selected in step S513, or if a low-frame-rate scene is played back (NO in step S512), a proper minimum playback speed is selected in step S514.

Similar to the first exemplary embodiment, the proper playback speed can be obtained by the playback speed determining unit 103 based on the sound characteristic information of audio data in a video content and the shooting frame rate information. Consequently, the proper playback speed range is assumed to be the ½× speed to 2× speed for scene A, ⅓× speed to 3× speed for scene B, and ¼× speed to 4× speed for scene C.

At this time, with scene A, since the shooting frame rate is equal to the standard frame rate, the content is played back at 1× speed. with scene B, since the shooting frame rate is lower than the standard frame rate, the content is played back at ⅓× speed as the proper minimum playback speed. With scene C, since the shooting frame rate is higher than the standard frame rate, the content is played back at 4× speed as the proper maximum playback speed.

In the first exemplary embodiment, whether the sound is audible is determined based on results of psychological experiment, but in a third embodiment, this determination is made based on voice recognition technology.

Figure 6:
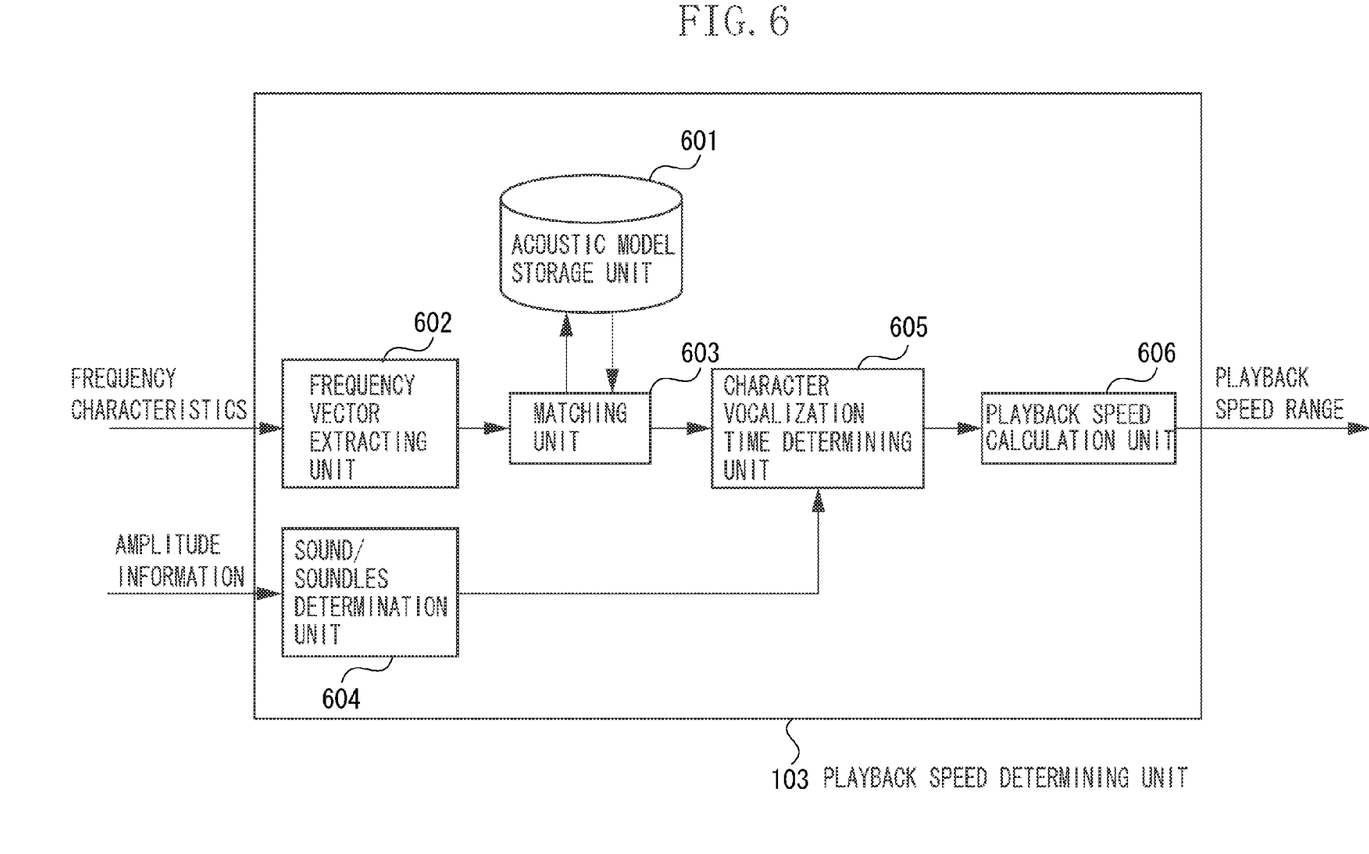
FIG. 6 is a block diagram of a playback speed determining unit according to an exemplary embodiment of the present invention.

FIG. 6 is a block diagram of the playback speed determining unit 103. The playback speed determining unit 103 is supplied with frequency characteristics and amplitude information of audio data of a video content from the sound information generating unit 102. At this time, the frequency characteristics are input to a feature vector extracting unit 602, and the amplitude information to a sound/soundless determining unit 604.

An acoustic model storage unit 601 previously stores an acoustic model representing acoustic features, such as phonemes and syllables. A feature vector extracting unit 602 performs Mel Frequency Cepstrum Coefficient (MFCC) acoustic analysis on input frequency information, and outputs results of acoustic analysis as feature vector to a matching unit 603.

The matching unit 603, while referring to an acoustic model stored in an acoustic model storage unit 601, performs voice recognition based on a Hidden Markov Model (HMM) method by using the feature model extracted by the feature vector extracting unit. The matching unit 603 outputs recognized results to a character vocalization time determining unit 605.

A sound/soundless determining unit 604 determines sound sections and soundless sections from input sound amplitude information. More specifically, the sections where an amplitude value of the sound exceeds a threshold value are determined to be sound sections, and the sections where the amplitude value of the sound does not exceed the threshold value are determined to be a soundless.

The character vocalization time determining unit 605 measures a number of frames during a period of time when recognized characters are vocalized according to results of voice recognition by the matching unit 603 and ratios between sound sections and soundless sections determined by the sound/soundless determining unit 604. For example, the sound information generating unit 102 extracts frequency characteristics of the sound in video data each 1000 frame unit, and outputs the extracted frequency information to the playback speed determining unit 103

Let us suppose that the matching unit 603 recognizes five characters (not illustrated) in the 1000 frames, which correspond to the written vowels "A I U E O" in the Japanese language, and that the sound/soundless determining unit 604 determines that the sound sections amount to 50 frames in the 1000 frames. In this case, the character vocalization time determining unit 605 determines that the five characters are vocalized over 50 frames in total.

The playback speed calculation unit 606 calculates a playback speed at which the user can understand the contents of the conversation based on determination results by the character vocalization time determining unit 605. In an ordinary news program, characters are read aloud at a rate of 6 to 8 characters a second.

Therefore, if six to eight characters per second is a playback speed at which to the user can catch the content, if a time to play back a character is set in a range of ⅛ seconds to ⅙ seconds, this can be considered to be a playback speed for easy audibility.

Therefore, in the present exemplary embodiment described above, five characters "A I U E O" occur over the 50 frames, and an average number of frames per character is 10 frames. Thus, frame rates of 10 fps per ⅙ sec (60 fps, 1× speed) to 10 fps per ⅛ sec (80 fps. 4/3× speed) are determined to be a playback speed for audibility of the speech.

While the present invention has been described with reference to exemplary embodiment, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-135313 filed Jun. 4, 2009, which is hereby incorporated by reference herein in its entirety.

What is claimed is:

1. An apparatus comprising:
 a generating unit configured to analyze frequency characteristics of audio data of a video content, and generate sound characteristic information;
 a determining unit configured to determine a playback speed range based on the sound characteristic information and a predetermined sound parameter, the playback speed range being automatically executed when the video content is stored in a storage unit;
 a control unit configured to determine a specific playback speed in the playback speed range according to a selected playback mode;
 a processing unit configured to perform a frame decimation and/or interpolation processing on video data of the video content based on the specific playback speed; and
 an output unit configured to output the video data to a display unit.

2. The apparatus according to claim 1, wherein the sound characteristic information is information concerning a frequency band of audio data synchronized with the video data calculated for each predetermined number of frames of the video data.

3. The apparatus according to claim 2, wherein the predetermined sound parameter is a parameter based on an audible frequency range of human beings.

4. The apparatus according to claim 1, wherein the video content includes a plurality of video portions having different shooting frame rates.

5. A method comprising:
analyzing frequency characteristics of audio data of a video content, and generating sound characteristic information;
determining a playback speed range based on the sound characteristic information and a predetermined sound parameter;
determining a specific playback speed within the playback speed range according to a selected playback mode, the playback speed range being automatically executed when the video content is stored in a storage unit;
performing a frame decimation and/or interpolation processing on video data of the video content based on the specific playback speed; and
outputting the video data to a display unit.

6. The method according to claim 5, wherein the sound characteristic information is information concerning a frequency band of audio data synchronized with the video data calculated for each predetermined number of frames of the video data.

7. The method according to claim 6, wherein the predetermined sound parameter is a parameter based on an audible frequency range of human beings.

8. The method according to claim 5, wherein the video content includes a plurality of video portions having different shooting frame rates.

9. A non-statutory computer readable storage medium storing a computer-executable program of instructions for causing a computer to perform a method comprising:
analyzing frequency characteristics of audio data of a video content, and generating sound characteristic information;
determining a playback speed range based on the sound characteristic information and a predetermined sound parameter;
determining a specific playback speed within the playback speed range according to a selected playback mode the playback speed range being automatically executed when the video content is stored in a storage unit;
performing a frame decimation and/or interpolation processing on video data of the video content based on the specific playback speed; and
outputting the video data to a display unit.

10. The non-statutory computer readable storage medium according to claim 9, wherein the sound characteristic information is information concerning a frequency band of audio data synchronized with the video data calculated for each predetermined number of frames of the video data.

11. The non-statutory computer readable storage medium according to claim 10, wherein the predetermined sound parameter is a parameter based on an audible frequency range of human beings.

12. The non-statutory computer readable storage medium according to claim 9, wherein the video content includes a plurality of video portions having different shooting frame rates.

* * * * *